(12) United States Patent
Dalit et al.

(10) Patent No.: US 8,467,807 B1
(45) Date of Patent: Jun. 18, 2013

(54) MOBILE COUPON WITH VARYING DISCOUNT BASED ON CONSUMER LOCATION

(75) Inventors: Christian G. Dalit, Palo Alto, CA (US); Colin J. Roper, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/345,425

(22) Filed: Jan. 6, 2012

(51) Int. Cl.
*H04W 24/00* (2009.01)

(52) U.S. Cl.
USPC .............. 455/456.2; 455/456.1; 455/456.3; 455/414.1; 725/23; 725/29; 705/14.34; 705/14.25

(58) Field of Classification Search
USPC ............ 455/414.1, 456.1, 456.2, 456.3, 433, 455/456.5, 445.1; 705/14.17, 23, 44, 14.34, 705/26.3, 7.13, 14.25; 235/380; 725/23, 36, 725/29; 713/160; 715/255; 340/988; 700/216, 700/232, 226, 236; 345/157; 707/724
See application file for complete search history.

(56) References Cited

U.S. PATENT DOCUMENTS

| | | | |
|---|---|---|---|
| 2002/0022488 A1* | 2/2002 | Srinivasan et al. | 455/456 |
| 2003/0004802 A1* | 1/2003 | Callegari | 705/14 |
| 2006/0047608 A1* | 3/2006 | Davis et al. | 705/400 |
| 2006/0242084 A1* | 10/2006 | Moses | 705/64 |
| 2011/0029173 A1* | 2/2011 | Hyde et al. | 701/22 |
| 2011/0313840 A1* | 12/2011 | Mason et al. | 705/14.35 |
| 2012/0036014 A1* | 2/2012 | Sunkada | 705/14.54 |

* cited by examiner

*Primary Examiner* — Mahendra Patel
(74) *Attorney, Agent, or Firm* — Osha Liang LLP

(57) ABSTRACT

A method for distributing a location aware mobile coupon (LAMC) based on a current location of a consumer using a mobile device. The method includes: receiving the current location of the mobile device from a location aware service (LAS) provider; comparing the current location of the mobile device to a retail location of a merchant to determine that the consumer is in proximity to the retail location of the merchant; obtaining pre-generated LAMC terms of the merchant specifying a maximum price discount of an item offered by the merchant; determining, in response to determining that the consumer is in proximity to the retail location, a price discount of the LAMC using a pre-determined formula based on the maximum price discount and a distance of the consumer to the retail location; and sending the LAMC including the price discount to the mobile device used by the consumer.

20 Claims, 4 Drawing Sheets

MOBILE COUPON WITH VARYING DISCOUNT BASED ON CONSUMER LOCATION

BACKGROUND

A coupon is a ticket or document that can be exchanged for a financial discount or rebate when purchasing a product or service. Customarily, coupons are issued by manufacturers or by retailers of consumer packaged goods, to be used in retail stores as a part of sales promotions. They are often widely distributed through mail, magazines, newspapers, the Internet, etc. They may be delivered directly from the issuer (i.e., retailer or manufacture) or delivered indirectly via a third party mobile marketing service, such as web sites that offer printable coupons or digital coupons on behalf of multiple manufacturers or retailers. Brick-and-mortar merchants (i.e., merchants operating physical stores) use coupons and discount offers as promotion to motivate consumers to visit and shop at their stores. Recent research studies suggest that consumers are significantly sensitive to the travel distance required for them to redeem a coupon/discount offer.

Location-aware service (LAS) is an information service, accessible using mobile devices through the mobile phone network and using the built-in ability of the mobile device to track the geographical position of the user. Examples of LAS include services to discover the nearest banking cash machine, personalized weather services, location-based games, etc.

SUMMARY

In general, in one aspect, the invention relates to a method for distributing a location aware mobile coupon (LAMC) based on a current location of a consumer using a mobile device. The method comprises: receiving the current location of the mobile device from a location aware service (LAS) provider; comparing, by a processor, the current location of the mobile device to a retail location of a merchant to determine that the consumer is in proximity to the retail location of the merchant; obtaining pre-generated LAMC terms of the merchant specifying a maximum price discount of an item offered by the merchant; determining, by the processor and in response to determining that the consumer is in proximity to the retail location, a price discount of the LAMC using a pre-determined formula based on the maximum price discount and a distance of the consumer to the retail location; and sending the LAMC comprising the price discount to the mobile device used by the consumer.

In general, in one aspect, the invention relates to a system for distributing location aware mobile coupon (LAMC) based on a current location of a consumer. The system comprises: a mobile device used by the consumer and configured to: receive location aware service (LAS) from a LAS; and receive the LAMC; an LAMC target locator executing on a processor and configured to: receive the current location of the mobile device from the LAS; and compare the current location of the mobile device to a retail location of a merchant to determine that the consumer is in proximity to the retail location of the merchant; an LAMC agent executing on the processor and configured to: obtain pre-generated LAMC terms of the merchant specifying a maximum price discount of an item offered by the merchant; determine, in response to determining that the consumer is in proximity to the retail location of the merchant, a price discount of the LAMC using a pre-determined formula based on the maximum price discount and a distance of the consumer to the retail location; and send the LAMC comprising the price discount to the mobile device used by the consumer; and a repository configured to store the pre-generated LAMC terms.

In general, in one aspect, the invention relates to a non-transitory computer readable storage medium comprising instructions for location aware mobile coupon (LAMC) based on a current location of a consumer using a mobile device. When executed, the instructions comprise functionality to: receive the current location of the mobile device from a location aware service (LAS) provider; compare the current location of the mobile device to a retail location of a merchant to determine that the consumer is in proximity to the retail location of the merchant; obtain pre-generated LAMC terms of the merchant specifying a maximum price discount of an item offered by the merchant; determine, in response to determining that the consumer is in proximity to the retail location, a price discount of the LAMC using a pre-determined formula based on the maximum price discount and a distance of the consumer to the retail location; and send the LAMC comprising the price discount to the mobile device used by the consumer.

Other aspects of the invention will be apparent from the following detailed description and the appended claims.

DETAILED DESCRIPTION

Figure 1:
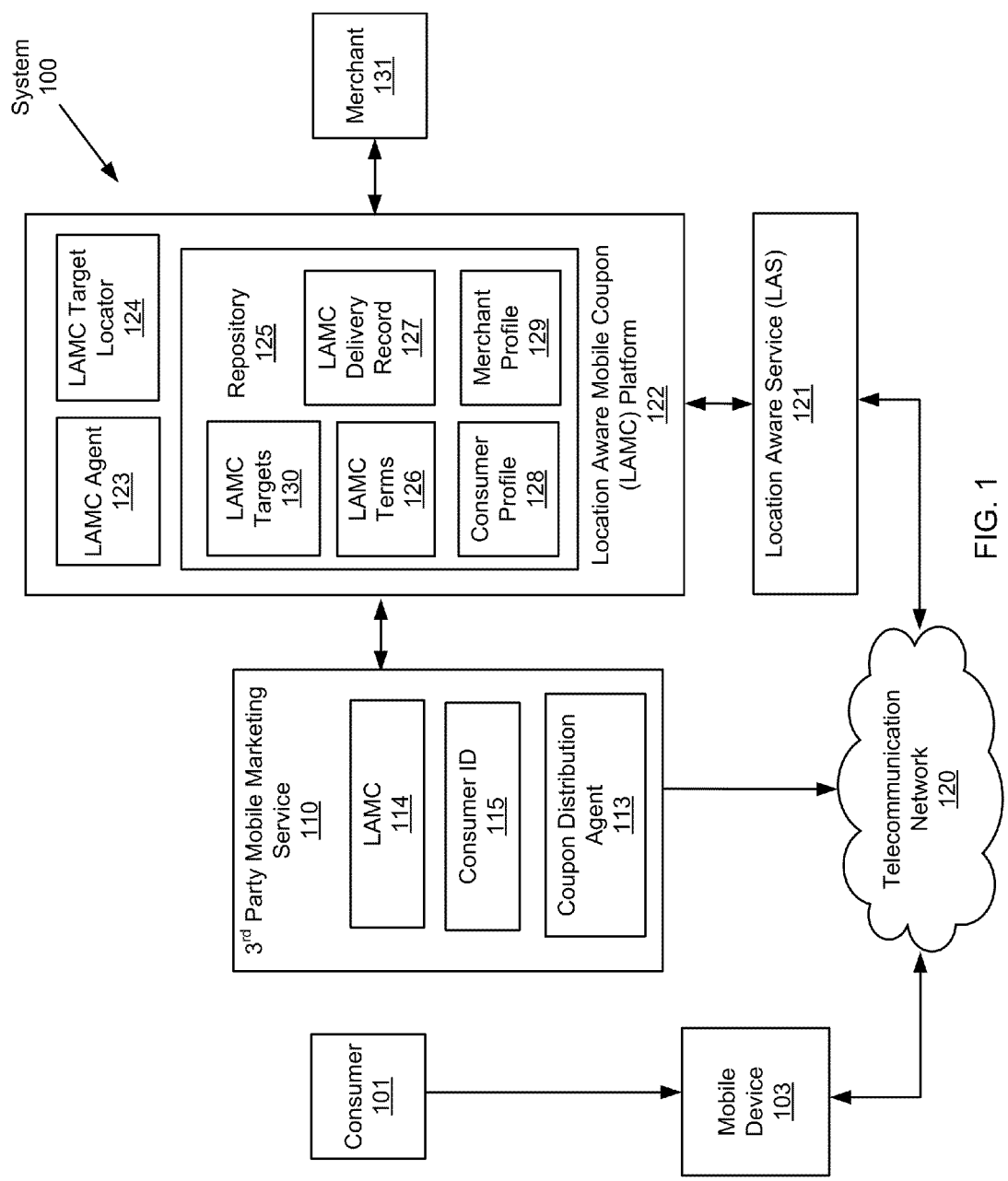
FIG. 1 shows a schematic diagram of a system for a mobile coupon with varying discount based on consumer location in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Conversion rates for coupons can be extremely low (i.e., few people actually visit the store and redeem the coupon), because merchants often don't discount enough in order to compensate for the extra time and effort required by consumers located "far away" from the store. On the other hand, many merchants are leaving money on the table by offering unnecessarily steep discounts in cases where customers are already near the store, leading to lower profit margins when they don't have to. Generally, a greater distance between the consumer and the store, implying that more time/effort would be required to take advantage of a merchant's promotion, reduces the perceived value of the promotion. Existing methods do not allow the merchant to easily optimize coupon/ discount offer's perceived value based on the distance between the location of consumers and the merchant's store location(s).

In general, embodiments of the invention provide a system and method for creating and distributing a location aware mobile coupon (LAMC) that offers a price discount dependent on a current location of a consumer. Accordingly, the merchant may optimize the perceived value of the LAMC based promotion to increase conversion rates and profit margin, while minimizing marketing costs. The goal is for the merchant to motivate consumers located at various distances from the merchant's store to visit the store at the lowest possible coupon discount. In one or more embodiments, the discount offered by the LAMC is dynamically changed based on the distance between the location of the consumer and the physical store where the LAMC can be redeemed. The LAMC eliminates the need for, and improves the result of, manually sending out mobile marketing messages with different discounts to consumers based on a prediction of where they are currently located.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a targeted advertisement system in accordance with embodiments disclosed herein.

As shown in FIG. 1, the system (100) includes consumer (101), third party mobile marketing service (110), and LAS (121) coupled via telecommunication network (120). In particular, the consumer (101) uses mobile device (103) (e.g., a smart phone, tablet computer, or other mobile computing/communication device) to access service from the LAS (121) and to receive various information available via the telecommunication network (120), such as messages from the third party mobile marketing service (110). In one or more embodiments of the invention, the telecommunication network (120) may include mobile phone network, WIFI, or any other suitable wireless communication network.

Further as shown in FIG. 1, the system (100) includes LAMC platform (122) used by a merchant (131) to define customized mobile coupons (e.g., LAMC (114)) to be delivered by the third party mobile marketing service (110) to the consumers (e.g., consumer (101)). Further, the LAMC platform (122) includes an LAMC agent (123), an LAMC target locator (124), and a repository (125). The repository (125) may be a database, persistent storage, or any other suitable type of storage device for storing LAMC targets (130), LAMC terms (126), LAMC delivery record (127), consumer profile (128), and merchant profile (129).

In one or more embodiments, the third party mobile marketing service (110) is a coupon distribution website where the consumer (101) may browse a catalog of coupons and retrieve those that interest him/her. In one or more embodiments, the third party mobile marketing service (110) is a target marketing website configured to track consumers by collecting demographical and purchase preference related information of consumers (e.g., consumer (101)), which are organized in consumer profile and indexed using unique consumer IDs (e.g., consumer ID (115)). For example, the consumer profile of the consumer (101) includes shopping history statistics, interested product categories, price preferences, geographical shopping locations, age, gender, income profile, information (e.g., mobile device ID such as cellular phone number or electronic serial number) identifying the mobile device (103), etc. Generally, the third party mobile marketing service (110) collects and organizes such consumer profiles using market survey or other methods known to those skilled in the art. In one or more embodiments, these consumer profiles or a portion of the information contained in these consumer profiles are provided to the LAMC platform under a certain business agreement and stored as the consumer profiles (128) in the repository (125).

In one or more embodiments, the third party mobile marketing service (110) includes the coupon distribution agent (113) that is configured to deliver a coupon (e.g., LAMC (114)) to a consumer (e.g., consumer (101) identified by consumer ID (115)) on behalf of the LAMC platform (122). Specifically, the coupon distribution agent (113) receives customized coupon information from an LAMC agent (123) of the LAMC platform (122) to create and distribute the LAMC (114) to the consumer (101). The customized coupon information may includes a specific product description, price discount, retailer information (e.g., store name, location, etc.), and identifying information (e.g., consumer ID (115) or a phone number of the mobile device (103)) of the consumer (101). In one or more embodiments, the coupon distribution agent (113) creates the LAMC (114) by instantiating a coupon template using the product description, price discount, and retailer information received from the LAMC agent (123) and delivers the LAMC (114) using the phone number of the mobile device (103), either by looking up based on the consumer ID (115) or obtained directly from the LAMC agent (123). In one or more embodiments, the LAMC (114) is delivered to the mobile device (103) in a text message, an email, or other form of electronically delivered message. In one or more embodiments, the mobile device (103) is a smartphone, tablet computer, or any other mobile computing device with telecommunication functionality, that is configured to receive such text message, email message, or other form of electronically delivered message containing the LAMC (114). Once the LAMC (114) is delivered successfully, the coupon distribution agent (113) provides delivery confirmation to the LAMC agent (123), which is stored in the repository (125) as the LAMC delivery record (127). Additional details of the interaction between the coupon third party mobile marketing service (110) and the LAMC platform (122) are described below.

In one or more embodiments of the invention, the system (100) includes the LAS (121) that is configured to provide the LAS to the consumer (101) via the mobile device (103) and provide the current location of the mobile device (103) to an LAMC target locator (124) of the LAMC platform (122). For example, the consumer (101) may have subscribed to the LAS (121) to discover the nearest banking cash machine, personalized weather services, location-based games, etc. In one or more embodiments, the LAS (121) and the third party marketing service (110) are integrated as one entity. In such embodiments, the consumer (101) may have subscribed to the LAS (121) to received distribution of LAMC.

In one or more embodiments of the invention, the LAMC platform (122) includes the LAMC target locator (124) that is configured to inquire the LAS (121) to obtain current locations associated with the LAMC targets (130), which is a list of consumers targeted by the LAMC platform (122) as potential recipients of the LAMC (e.g., consumer (101) receiving LAMC (114)). In one or more embodiments, targeted consumers (e.g., consumer (101)) tracked by the third party mobile marketing service (110) are provided to the LAMC platform (122) to be included in the LAMC targets (130). In one or more embodiments, subscribers (e.g., consumer (101))

of the LAS (121) are provided to the LAMC platform (122) to be included in the LAMC targets (130). In one or more embodiments, the consumer (101) may be included in the LAMC targets (130) based on opt-in agreements when the consumer (101) subscribes to other services (not shown) that in turn provide information regarding the consumer (101) to the LAMC platform (122) under certain business agreements. In one or more embodiments, a consumer included in the LAMC targets (103) is either already a subscriber (i.e., user) of the LAS (121) or will be invited to subscribe to the LAS (121) such that the LAS (121) may track his/her location for providing to the LAMC target locator (124). For example, the LAMC target locator (124) may periodically provide the LAMC targets (130), or a portion thereof, to the LAS (121) to ensure all consumers included in the LAMC targets (130) are location-tracked by the LAS (121).

In one or more embodiments, certain information (e.g., a portion of the consumer profile (128)) regarding the consumer (101) is shared among the third party mobile marketing service (110), the LAMC platform (122), and the LAS (121) based on the consumer ID (115). In such embodiments, the consumer (101) may be identified using the consumer ID (115) in the LAMC targets (130) and the consumer profile (128). For example, the consumer ID (115) may be the cellular phone number or electronic serial number of the mobile device (103). In another example, the consumer ID (115) is other alphanumeric string linked with the phone number of the mobile device (103). Accordingly, LAMC target locator (124) may inquire the LAS (121) based on the consumer ID (115) to obtain the current location of the mobile device (103). For example, the consumer (101) may be accessing the LAS (121) for receiving service using the mobile device (103), thus making his current location available to the LAS (121) based on the cellular phone number or electronic serial number of the mobile device (103). Further, the LAMC target locator (124) is configured to compare the current location of the mobile device (103) to a retail location of the merchant (131) to determine whether the consumer (101) is currently in proximity to the retail location of the merchant (131). For example, the retail location of the merchant (131) may be included in the merchant profile (129) provided by the merchant (131) when registering with the LAMC platform (122). In addition, the merchant profile (129) may also include retail location store hours, merchandise categories, product descriptions, etc. of the merchant (131).

In one or more embodiments of the invention, the LAMC platform (122) includes the LAMC agent (123) that is configured to generate the LAMC (114) by customizing pre-generated LAMC terms (126) of the merchant (131) in response to detecting the consumer (101) being in proximity to the retail location of the merchant (131). For example, the LAMC terms (126) may include generic coupon information of the merchant (131) such as product description, a range of approved coupon discounts for each product listed in a promotion list, a default perimeter radius indicating how far the LAMCs are to be distributed from the store location, and a default expiration period. For example, the range, perimeter radius, and/or expiration period may be the same for all products in the promotion list. In another example, the range, perimeter radius, and/or expiration period may be different for different products in the promotion list. In one or more embodiments, the LAMC terms (126) are pre-generated before being used to create the LAMC (114) and are periodically updated by the merchant (131) based on marketing/promotional requirements. By customizing the pre-generated LAMC terms (126), the LAMC (114) may include a specific price discount customized for the consumer (101) using a pre-determined formula based on the range (e.g., maximum limit and minimum limit) of discount specified in the LAMC terms (126) and the current distance of the consumer (101) from a particular retail location of the merchant (131) currently near the consumer (101). Further, the LAMC (114) may include a customized expiration period based on one or more of the following: (i) the distance from the current location of the mobile device (103) to the retail location of the merchant (131), (ii) an estimated travel speed of the consumer (101), abd (iii) an estimated traveling method (e.g., by car, walking, etc.). For example, the travel speed may be estimated based on rate of change of the location of the consumer (101) as determined by the LAMC target locator (124) or determined by the LAS (121) and provided to the LAMC target locator (124). In another example, the distance may be estimated based on a geo-location mapping application.

In one or more embodiments, the LAMC (114) may include discount offers for one or more of the products selected randomly from the promotion list of the merchant (131). In one or more embodiments, the LAMC (114) may include discount offers for one or more of the products selected from the promotion list of the merchant (131) based on historical purchase or other preference information of the consumer (101) retrieved from the consumer profile (128). In one or more embodiments, the formula used to optimize the specific price discount of the LAMC (114) is pre-determined based on statistical analysis of historical conversion data.

In one or more embodiments, the formula used to optimize the specific price discount of the LAMC (114) is dynamically adjusted using machine learning techniques to correlate the LAMC delivery record (127) to coupon redemption statistics (not shown) provided by the merchant (131) over a statistically relevant sample size of LAMCs and targeted consumers (referred to as a target consumer study group) or time period of LAMC delivery (referred to as a target study period). In one or more embodiments, such correlated information is organized and updated as LAMC redemption statistics based on which machine learning techniques known to those skilled in the art are used to optimize this formula. For example, the formula may determine the price discount of the LAMC (114) within the maximum and minimum limits of the LAMC terms (126) based on a linear dependence of the current distance of the consumer (101) from the store as a percentage of the perimeter In one or more embodiments, this formula is further based on demographical and other preference information of the consumer (101) retrieved from the consumer profile (128) as well as information regarding the merchant (131) retrieved from the merchant profile (129). For example, the consumer profile (128) may include price sensitivity or anniversary information of the consumer (101) that is used to customize certain parameters in the aforementioned formula. The merchant profile (129) may include store hours, traffic pattern, product category information, etc. of the particular store near the consumer (101). Accordingly, the price discount may be skewed based on the price sensitivity of the consumer (101), time of potential visit by the consumer (101) relative to the store hours or when the traffic is statistically light or heavy, or product category matching gift giving occasion when the consumer (101) is near the store immediately prior to the anniversary date, etc. In another example, the LAMC (114) may draw the attention of the consumer (101) to particular aspects of the retail location described in the merchant profile (129) and/or direct the consumer (101) to enter the retail location from his current location based on descriptions in the merchant profile (129).

In one or more embodiments of the invention, the LAMC agent (123) is further configured to send the LAMC (114) to the mobile device (103). For example, the LAMC agent (123) may send the LAMC (114) directly to the mobile device (103). In another example, the LAMC agent (123) may provide customized versions of the LAMC terms (126) to the third party mobile marketing service (110) where the LAMC (114) is generated and sent by the coupon distribution agent (113).

In one or more embodiments, the LAS (121) and the third party marketing service (110) are integrated as one entity that does not want to share user locations but are interested to distribute LAMC. In such embodiments, the LAMC agent (123) may provide a formula for customizing the LAMC terms (126) to the integrated entity and allows the integrated entity to customize and generate the LAMC (114) based on the formula for presenting to their users (e.g., consumer (101)).

In one or more embodiments of the invention, the LAMC agent (123) is further configured to receive, from the third party mobile marketing service (110), a confirmation that the LAMC (114) has been successfully delivered to the mobile device (103). Upon receiving the confirmation of successful delivery of the LAMC (114), the LAMC agent (123) generates the LAMC delivery record (127) for providing to the merchant (131). In one or more embodiments, the merchant (131) is charged a fee by the LAMC platform (122) for delivery of the LAMC (114) based on the LAMC delivery record (127). Similarly, the LAMC agent (123) is further configured to receive, from the third party mobile marketing service (110), statistics of views and clicks of the LAMC (114) by the consumer (101) while browsing information provided by the third party mobile marketing service (110). Accordingly, the merchant (131) is charged a fee by the LAMC platform (122) based on the statistics of views and clicks of the LAMC (114). Further, the merchant (131) may also be charged a fee by the LAMC platform (122) based on actual redemption of the LAMC (114) by the consumer (101) based on redemption record provided by either the third party mobile marketing service (110) or the merchant (131). In one or more embodiments, the fees collected by the LAMC platform (121) from the merchant (131) is in turn paid to the third party marketing service (110) based on certain business agreement.

In one or more embodiments of the invention, the merchant (131) may be any business operation (e.g., store, restaurant, personal service provider, consulting firm, online merchant, insurance agency, repair service, etc.) or an individual that engages in retail activities (e.g., offering products or service for sale) targeting the consumer (101). In one or more embodiments, the merchant (131) registers an account with the LAMC platform (122) to order LAMC delivery by providing the LAMC terms (126). From time to time, the LAMC terms (126) may be updated, supplemented, or otherwise modified by the merchant (131).

In one or more embodiments of the invention, the LAMC platform (122) has access to consumer information based on business agreements established with the third party mobile marketing service (110) and the LAS (121). In one or more embodiments, the LAMC platform (122) may be a hosted application on the web or a software-as-a-service (SaaS) offering from an application service provider that is separate from the third party mobile marketing service (110) and the LAS (121). In one or more embodiments, the LAMC platform (122) may be integrated with or a portion of the third party mobile marketing service (110) or the LAS (121). In one or more embodiments, the LAMC platform (122) may be configured with the functionalities to track consumer locations and to deliver LAMC to consumers directly without coupling to the third party mobile marketing service (110) and/or the LAS (121).

Figure 2:
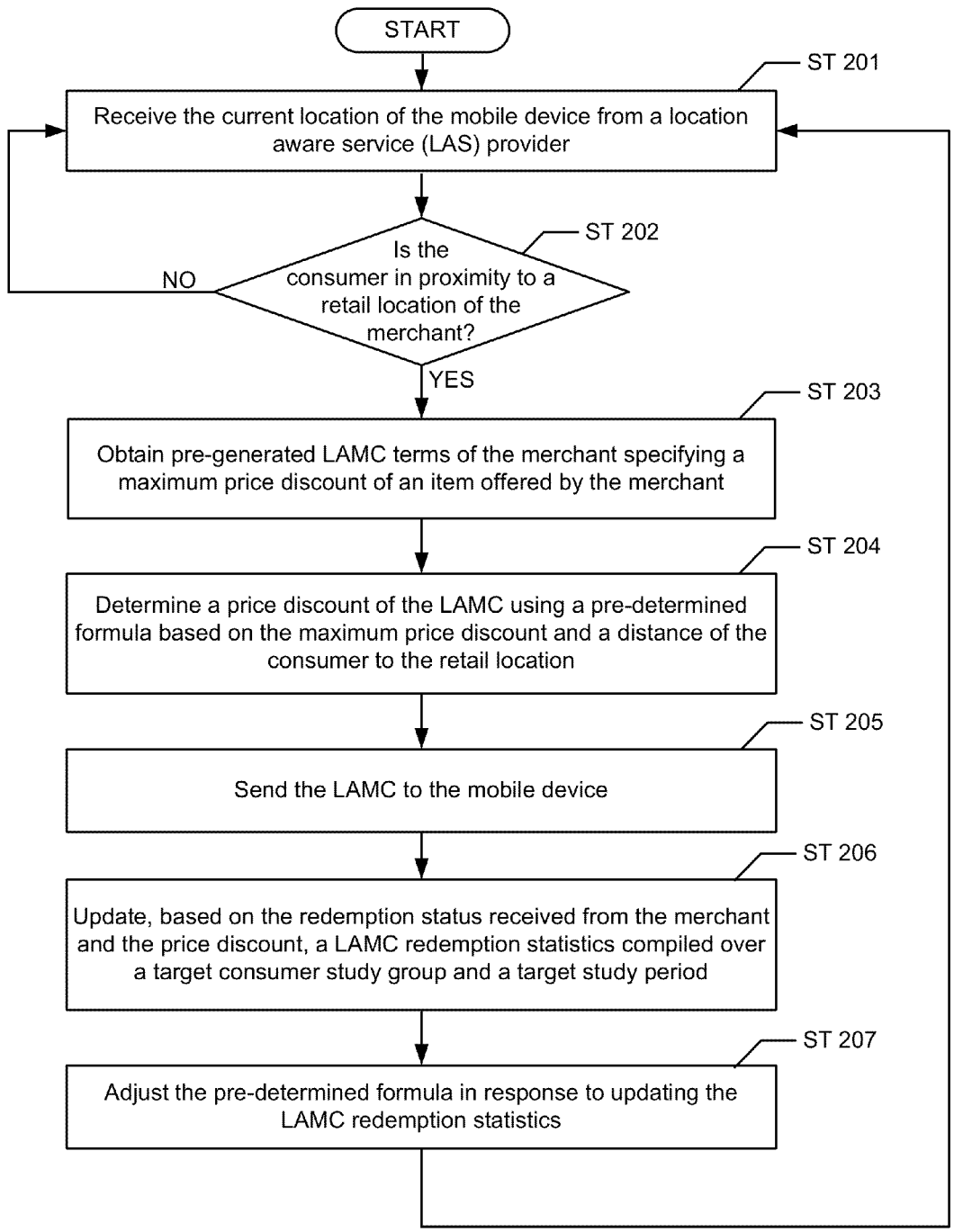
FIG. 2 shows a flowchart of a method for a mobile coupon with varying discount based on consumer location in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1 above.

As noted above, the method directs to providing an LAMC platform to allow merchants to create mobile coupons/deals. This LAMC platform allows merchants to set a maximum and minimum discount (e.g., max.: 50%, min.: 20%) that can be offered by the LAMC. This LAMC platform also allows the merchant to set a perimeter radius, indicating how far the LAMC is to be distributed from the store location. When a consumer accesses a coupon from his/her mobile device, his/her location (either the absolute location or a relative location) is taken into consideration within the algorithm that determines the optimal price discount. Further, this algorithm may also determine the optimal expiration period, possibly using an electronic street map to estimate traveling time for the consumer to arrive at the store from his/her current location. This algorithm may also track the conversion of these mobile coupons and use machine learning methods based on the observed conversion data to constantly updating the optimization formula used by the algorithm.

Initially in Step 201, a current location of a mobile device of a consumer is received from a LAS provider in accordance with one or more embodiments of the invention. For example, the consumer may have subscribed to use the LAS and opt-in to allow the LAS provider to share his/her location information, for example with the LAMC platform. In one or more embodiments, the consumer may be one of many target consumers tracked in a database of potential LAMC recipient. For example, such database may be obtained from a market survey, the LAS provider, a third party mobile marketing service, or the merchant using the LAMC platform to offer promotional discounts.

In Step 202, a determination is made as to whether the consumer is in proximity to a retail location of the merchant in accordance with one or more embodiments of the invention. Specifically, the location of the consumer obtained from the LAS provider is compared to the retail location. In one or more embodiments, the proximity criterion is specified by the merchant as a perimeter radius from the store location within which to distribute the LAMC. In one or more embodiments, consumer's travel speed is estimated based on a rate of change of the consumer's location obtained from the LAS or based on a travel mode of the consumer obtained from the LAS indicating whether the consumer is driving or walking. Accordingly, the proximity may be determined according to a maximum estimated travel time for the consumer to arrive at the store from his/her current location.

In Step 203, pre-generated LAMC terms of the merchant is obtained that specifies a maximum price discount of an item offered by the merchant in accordance with one or more embodiments of the invention. In one or more embodiments, the pre-generated LAMC terms also specify a minimum price discount of the item, a default expiration period, and the proximity criterion used in Step 202 to determine whether the consumer is in proximity to the store. In one or more embodiments, the LAMC terms refer to fields in a consumer profile and/or a merchant profile so that the LAMC can be further customized based on characteristics of the consumer and the merchant.

In Step 204, a price discount of the LAMC is determined using a pre-determined formula based on the maximum price discount and a distance of the consumer to the retail location in accordance with one or more embodiments of the invention. In one or more embodiments, the actual price discount of the LAMC equals the maximum price discount when the consumer is relatively far away and barely meets the proximity criterion, e.g., the consumer may be at the very end of the aforementioned perimeter radius. In this case, the maximum discount is offered to provide the highest level of incentive to encourage the consumer to visit the store. In one or more embodiments, the actual price discount of the LAMC equals the minimum price discount when the consumer is very close to the store, e.g., the consumer may already be at the store front. In this case, the minimum discount is offered because it is relatively easy for the consumer to visit the store. In one or more embodiments, the actual discount of the LAMC is determined using a mathematical formula based on the distance between the consumer and the store. In one or more embodiments, the actual discount of the LAMC is determined using a mathematical formula based on an estimated travel time for the consumer to arrive the store. In one or more embodiments, the distance and/or the estimated travel time may be determined using an electronic street map covering the vicinity of the store. For example, the mathematical formula may correspond to a linear function, a quadratic function, an exponential function, a logarithmic function, a look-up table, any other suitable function, or a combination thereof. In one or more embodiments, the mathematical formula is parameterized such that the corresponding function can be adjusted using different parameter values in the mathematical formula. For example, the parameter values may be adjusted to achieve an optimal incentive for attracting the consumer to visit the store.

In one or more embodiments, the mathematical formula, and/or the parameter values therein, is the same for multiple products listed on the LAMC. In one or more embodiments, the mathematical formula, and/or the parameter values therein, is different for different categories of products listed on the LAMC. In one or more embodiments, this mathematical formula is further based on demographical and other preference information of the consumer retrieved from a consumer profile as well as information regarding the merchant retrieved from a merchant profile. For example, the consumer profile may include price sensitivity or anniversary information of the consumer that are used to customize the parameters in the mathematical formula. The merchant profile may include store hours, traffic pattern, product category information, etc. of the particular store near the consumer. Accordingly, the mathematical formula may skew the price discount based on the price sensitivity of the consumer, time of potential visit by the consumer relative to the store hours or when the traffic is statistically light or heavy, or product category matching gift giving occasion when the consumer is near the store immediately prior to the anniversary date, etc.

In Step 205, the LAMC is sent to the mobile device of the consumer in accordance with one or more embodiments of the invention. In one or more embodiments, the LAMC is sent to the mobile device directly from the LAMC platform. In one or more embodiments, the LAMC is sent to the mobile device via a third party mobile marketing service. In one or more embodiments, the LAMC is sent in a text message, in an email message, as a web-link, or any other electronic format that is compatible with the mobile device.

In Step 206, redemption status is received from the merchant indicating whether the consumer makes a purchase using the LAMC in accordance with one or more embodiments of the invention. The redemption status of the LAMC is included in a statistically relevant sample dataset compiled over a target consumer study group and a target study period. In one or more embodiments, one or more of the actual discount, the consumer distance/travel time to the store, unit price of the product, and other information related to the LAMC are correlated to the redemption status of the LAMC for each LAMC in the sample dataset to generate an LAMC redemption statistics. For example, the correlation may be performed using machine learning techniques to identify sensitivity of LAMC redemption status to one or more of the actual discount, the consumer distance/travel time to the store, unit price of the product, and other information related to the LAMC. In one or more embodiments, such correlation (referred to as the redemption statistics) may be represented in a machine learning model, such as a neural network generated by the machine learning techniques. For example, the machine learning model may include key variables on which the LAMC redemption status depends and the statistical relationship between the LAMC redemption status and each key variable. In one or more embodiments, the machine learning model, representing the redemption statistics, is incrementally updated on a periodic basis as LAMC redemption status is tallied. For example, the redemption statistics may be updated every day, every week every month, every quarter, every time when additional 100 LAMCs are distributed, every time when additional $1000 worth of merchandize are purchase with LAMC redemption, or based on other suitable conditions.

In Step 207, the mathematical formula for determining actual discount of the LAMC is adjusted in response to updating the LAMC redemption statistics in accordance with one or more embodiments of the invention. In one or more embodiments, the mathematical formula is adjusted based on the aforementioned machine learning model to achieve a balance between the conversion rate and the profit margin. For example, the goal of the adjustment may be to meet a target conversion rate requested by the merchant while maintaining a profitability measure above a minimum acceptable limit. In another example, the parameter values used in the mathematical formula may be adjusted based on the aforementioned neural network. Accordingly, the method returns to Step 201 to identify another consumer as potential recipient of the LAMC based on this adjusted formula.

Figure 3:
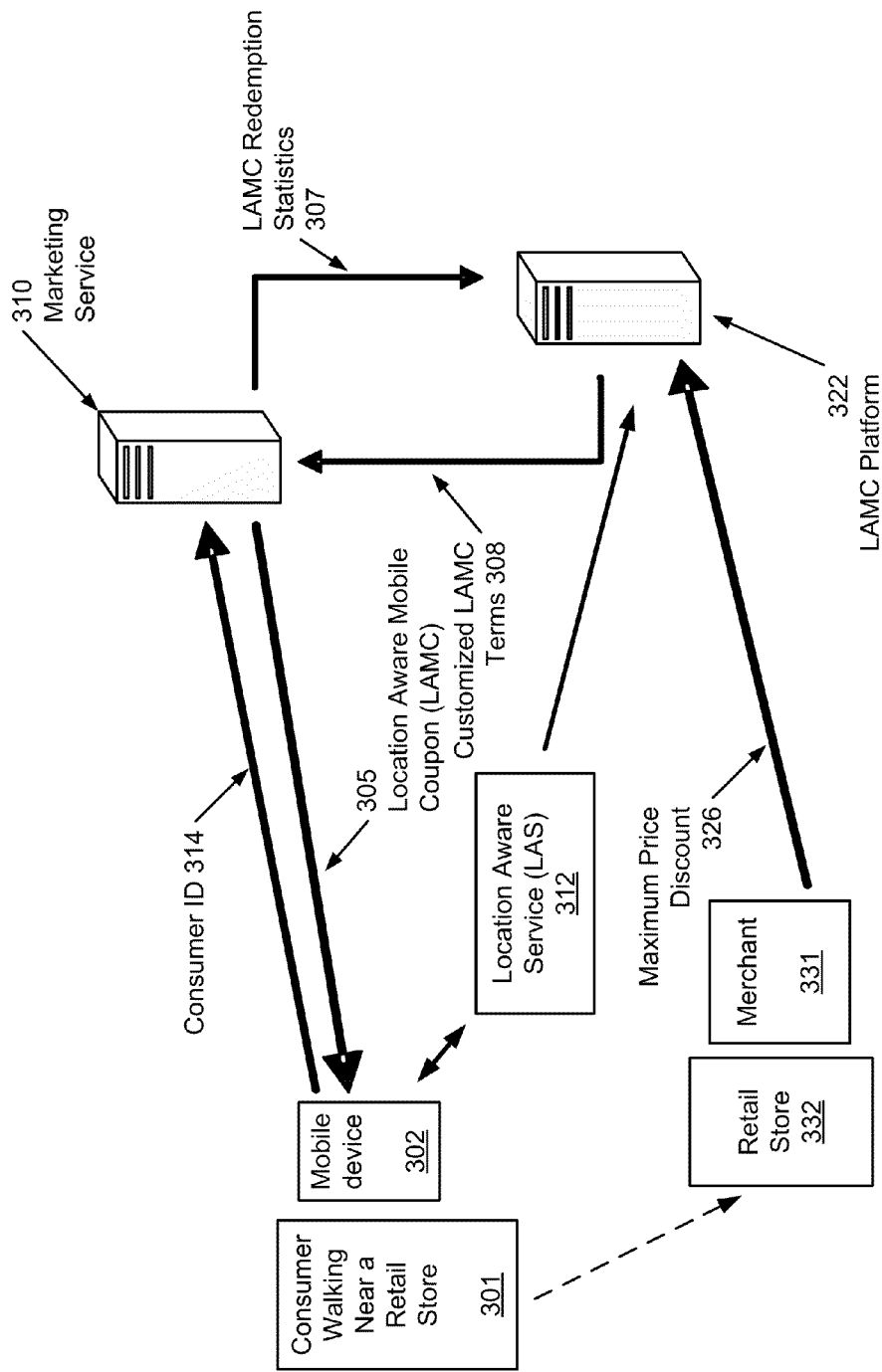
FIG. 3 shows an example of a mobile coupon with varying discount based on consumer location in accordance with one or more embodiments of the invention.

FIG. 3 shows an application example in accordance with one or more embodiments of the invention. This example application may be practiced using the system (100) of FIG. 1 and based on the method described with respect to FIG. 2 above.

The following is a step-by-step usage scenario depicted in FIG. 3. The merchant (331) Aston is a local small business owner of the retail store (332) "The Hardware Store." Foot traffic to his store is fairly bleak because it is located off of the main road in town. He decides to subscribe to a new mobile coupon distribution system "LAMC platform" (322). He chooses to offer a "percent-off coupon" for any one regular priced item in the store. Aston doesn't specify the actual percent-off that consumers will see, he only specifies the maximum percent-off he is willing to offer: "50%." He inputs additional information including expiration date, terms and conditions, etc. The LAMC platform (322) disseminates Aston's coupon through various channels (e.g., partnerships with 3rd-party mobile marketing distributors, etc.). Within Aston's coupon, the "percent-off" section is customized for every consumer that sees it. Through an algorithm, the LAMC platform (322) fills in this "percent-off" section with a discount amount based in part on the relative location of the consumer, such as his/her distance from the retail store (332) where he/she can redeem the coupon. The further away, the higher the discount, and vice-versa. Other inputs could include user and population usage of that particular offer and other related offers, and the specific location of the user (rather than the absolute distance).

The LAMC platform (322) knows that consumer (301) Emily is 2 miles away from the retail store (332). This information is based on GPS information of Emily's phone (mobile device (302)) that is tracked by the location aware service (LAS) (312) used by Emily based on a consumer ID (314). The LAS (312) shares Emily's location information with the LAMC platform (322), which creates a customized coupon by sending customized LAMC terms (308) to the marketing service (310). The customized LAMC terms (308) includes a list of items offered by the retail store (332) with a customized discount percent that is calculated by the LAMC platform (322) based on the 2 mile distance figure and other profile information of Emily. Because 2 mile distance is considered relatively far away by the algorithm used by the LAMC platform (322), the customized discount for Emily is set to the maximum, or 50%. The marketing service (310) creates the LAMC (305) based on the customized LAMC terms (308) and sends it to Emily's mobile device (302).

Emily sees Aston's coupon on her phone; it reads, "Get 50%-off any one regular priced item at The Hardware Store. Expires in 30 minutes." The expiration time is an additional dynamic feature that is also influenced by Emily's distance from the retail store (332). Emily decides that, for 50%-off, it is worth the effort to drive over to Aston's store to buy something. If the discount was any less, she would not have been motivated enough to leave the house.

Another consumer Amber who just got out of work and is currently located 0.1 miles away sees an Aston coupon on her phone. It reads, "Get 20%-off any one regular priced item at The Hardware Store. Expires in 15 minutes." Since she's so close to the Aston's store, the amount of time and effort required to redeem this coupon is low. So she's perfectly motivated to visit the store with only a 20%-off discount.

Aston is a delighted user of the LAMC platform (322), since he is able to optimize conversion and profit margin. Emily and Amber are both delighted that they received these deals. The redemption of the coupons sent to Emily and Amber are reported by Aston to the marketing service (310), which in turn compiles this information into the LAMC redemption statistics (307) that is provided to the LAMC platform (322). Overtime, the LAMC platform uses the LAMC redemption statistics (307) to fine tune the algorithm it uses for determining the distance-based discount.

Figure 4:
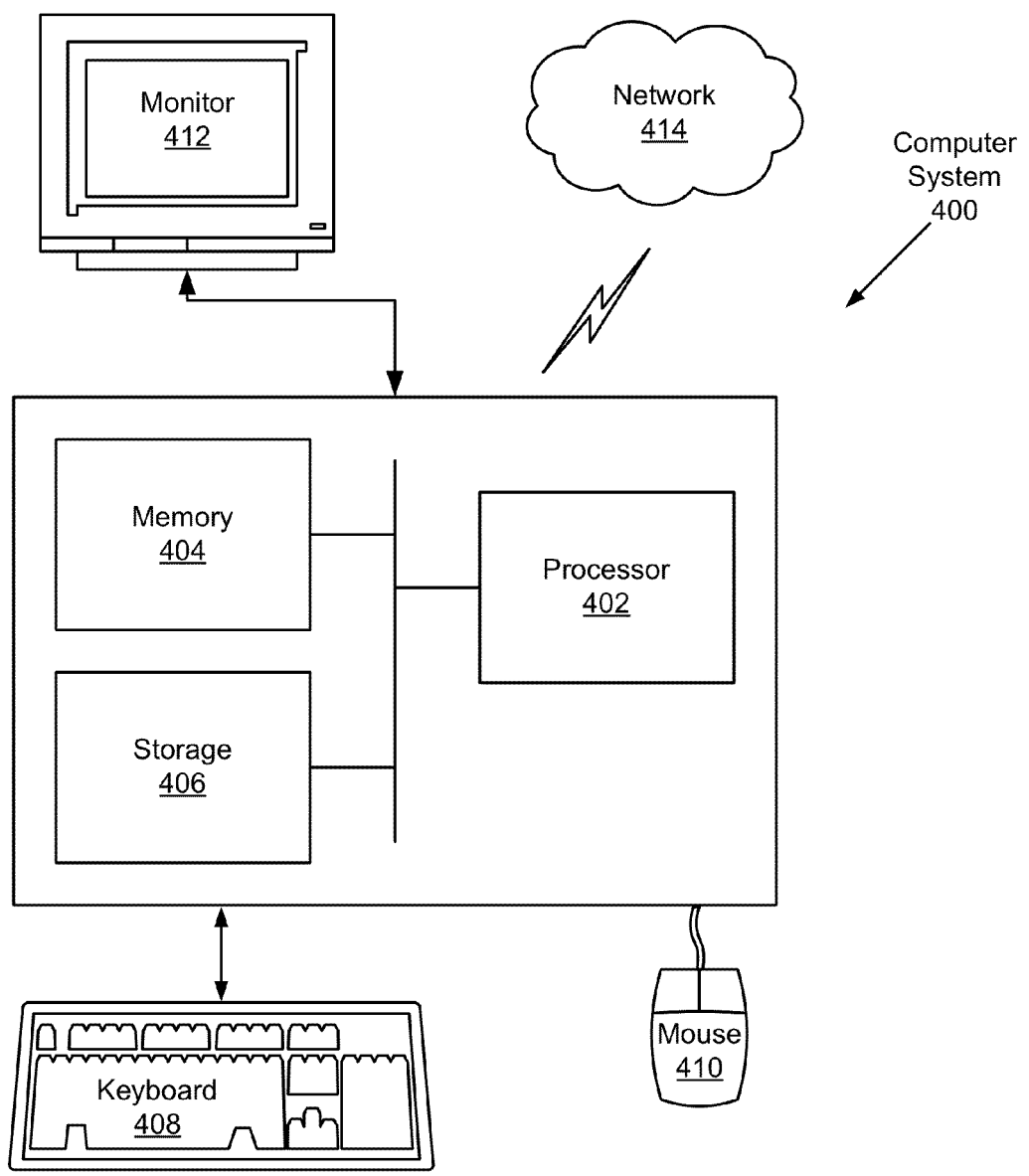
FIG. 4 shows a diagram of a computer in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various elements of the LAMC agent (123), LAMC target locator (124), the repository (125), etc. in FIG. 1) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for distributing a location aware mobile coupon (LAMC) based on a current location of a consumer using a mobile device, comprising:
   receiving the current location of the mobile device from a location aware service (LAS) provider;
   comparing, by a processor, the current location of the mobile device to a retail location of a merchant to determine that the consumer is in proximity to the retail location of the merchant;
   obtaining pre-generated LAMC terms of the merchant specifying a maximum price discount of an item offered by the merchant;
   determining, by the processor and in response to determining that the consumer is in proximity to the retail location, a non-zero price discount of the LAMC using a pre-determined formula based on the maximum price discount, wherein the pre-determined formula specifies the non-zero price discount as a function of parameters, the parameters comprising the distance from the current location of the mobile device to the retail location, time of the day, day of the week, and any special event;
   determining, by the processor and in response to determining that the consumer is in proximity to the retail location of the merchant, an expiration time of the LAMC based on the distance from the current location of the mobile device to the retail location of the merchant;
   sending the LAMC comprising the non-zero price discount and the expiration time to the mobile device used by the consumer;

receiving, in response to sending the LAMC, a confirmation that the LAMC is delivered to the mobile device; and providing, to the merchant, an LAMC delivery record comprising the confirmation, wherein the non-zero price discount includes at least a minimum discount amount specified by the pre-determined formula.

2. The method of claim 1, wherein sending the LAMC comprises:

providing the LAMC to a third party mobile marketing service, wherein the LAMC is sent to the mobile device by the third party mobile marketing service.

3. The method of claim 2, wherein the mobile device comprises a smartphone of the consumer.

4. The method of claim 1, further comprising:

receiving, from the merchant, a redemption status of the LAMC by the consumer;

updating, based on the redemption status and the non-zero price discount, an LAMC redemption statistics compiled over a target consumer study group and a target study period; and adjusting the pre-determined formula in response to updating the LAMC redemption statistics.

5. The method of claim 1, wherein the LAMC comprises a message directing the consumer from the current location of the mobile device to the retail location of the merchant.

6. A system for distributing location aware mobile coupon (LAMC) based on a current location of a consumer, comprising:

a mobile device used by the consumer and configured to:
  receive location aware service (LAS) from a LAS provider; and
  receive the LAMC;

an LAMC target locator executing on a processor and configured to:
  receive the current location of the mobile device from the LAS; and
  compare the current location of the mobile device to a retail location of a merchant to determine that the consumer is in proximity to the retail location of the merchant;

an LAMC agent executing on the processor and configured to:
  obtain pre-generated LAMC terms of the merchant specifying a maximum price discount of an item offered by the merchant;
  determine, in response to determining that the consumer is in proximity to the retail location of the merchant, a non-zero price discount of the LAMC using a pre-determined formula based on the maximum price discount, wherein the non-zero price discount is calculated as a function of parameters, the parameters comprising the distance from the current location of the mobile device to the retail location, time of the day, day of the week, and any special event;
  determine, in response to determining that the consumer is in proximity to the retail location of the merchant, an expiration time of the LAMC based on the distance from the current location of the mobile device to the retail location of the merchant;
  send the LAMC comprising the non-zero price discount to the mobile device used by the consumer;
  receive, in response to sending the LAMC, a confirmation that the LAMC is delivered to the mobile device; and
  provide, to the merchant, an LAMC delivery record comprising the confirmation; and a repository configured to store the pre-generated LAMC terms, wherein the non-zero price discount includes at least a minimum discount amount specified by the pre-determined formula.

7. The system of claim 6, further comprising:

a third party mobile marketing service configured to deliver the LMAC to the mobile device on behalf of the LAMC agent.

8. The system of claim 6, wherein the mobile device comprises a smartphone of the consumer.

9. The system of claim 6, wherein the LAMC agent is further configured to:

receive, from the merchant, a redemption status of the LAMC by the consumer;

update, based on the redemption status and the non-zero price discount, an LAMC redemption statistics compiled over a target consumer study group and a target study period; and adjust the pre-determined formula in response to updating the LAMC redemption statistics.

10. The system of claim 6, wherein the LAMC comprises a message directing the consumer from the current location of the mobile device to the retail location of the merchant.

11. The system of claim 6, further comprising a location aware service (LAS) configured to:

provide the LAS to the consumer via the mobile device; and provide the current location of the mobile device to the LAMC target locator.

12. The system of claim 6, wherein the repository is further configured to store a consumer profile of the consumer and a merchant profile of the merchant, and wherein determining the non-zero price discount of the LAMC using the pre-determined formula is further based on the consumer profile and the merchant profile.

13. A non-transitory computer readable storage medium comprising instructions for location aware mobile coupon (LAMC) based on a current location of a consumer using a mobile device, that when executed, comprise functionality to:

receive the current location of the mobile device from a location aware service (LAS) provider;

compare the current location of the mobile device to a retail location of a merchant to determine that the consumer is in proximity to the retail location of the merchant;

obtain pre-generated LAMC terms of the merchant specifying a maximum price discount of an item offered by the merchant;

determine, in response to determining that the consumer is in proximity to the retail location of the merchant, a non-zero price discount of the LAMC using a pre-determined formula based on the maximum price discount, wherein the non-zero price discount is calculated as a function of parameters, the parameters comprising the distance from the current location of the mobile device to the retail location, time of the day, day of the week, and any special event;

determine, in response to determining that the consumer is in proximity to the retail location of the merchant, an expiration time of the LAMC based on the distance from the current location of the mobile device to the retail location of the merchant;

send the LAMC comprising the non-zero price discount to the mobile device used by the consumer;

receive, in response to sending the LAMC, a confirmation that the LAMC is delivered to the mobile device; and provide, to the merchant, an LAMC delivery record comprising the confirmation, wherein the non-zero price discount includes at least a minimum discount amount specified by the pre-determined formula.

14. The non-transitory computer readable storage medium of claim 13, wherein sending the LAMC comprises:

providing the LAMC to a third party mobile marketing service, wherein the LAMC is sent to the mobile device by the third party mobile marketing service.

15. The non-transitory computer readable storage medium of claim 14, wherein the mobile device comprises a smartphone of the consumer.

16. The non-transitory computer readable storage medium of claim 13, the instructions when executed further comprising functionality to:

receive, from the merchant, a redemption status of the LAMC by the consumer;

update, based on the redemption status and the non-zero price discount, an LAMC redemption statistics compiled over a target consumer study group and a target study period; and adjust the pre-determined formula in response to updating the LAMC redemption statistics.

17. The non-transitory computer readable storage medium of claim 13, wherein the LAMC comprises a message directing the consumer from the current location of the mobile device to the retail location of the merchant.

18. The method of claim 1, wherein the parameters further comprises at least one variable selected from a group consisting of price sensitivity of the consumer, anniversary information of the consumer, store hours of the retail location, traffic pattern of the retail location, and product category information of the retail location.

19. The system of claim 6, wherein the parameters further comprises at least one variable selected from a group consisting of price sensitivity of the consumer, anniversary information of the consumer, store hours of the retail location, traffic pattern of the retail location, and product category information of the retail location.

20. The non-transitory computer readable storage medium of claim 13, wherein the parameters further comprises at least one variable selected from a group consisting of price sensitivity of the consumer, anniversary information of the consumer, store hours of the retail location, traffic pattern of the retail location, and product category information of the retail location.

* * * * *